United States Patent [19]

Dennis et al.

[11] Patent Number: 4,839,096
[45] Date of Patent: Jun. 13, 1989

[54] LOW TOXICITY OIL COMPOSITION AND USE THEREOF IN DRILLING FLUIDS

[75] Inventors: Robert W. Dennis, North Humberside; Charles J. Dye, Hull; Alan Keasey, Sussex, both of England

[73] Assignee: BP Chemicals Limited, London, England

[21] Appl. No.: 62,156

[22] Filed: Jun. 12, 1987

[30] Foreign Application Priority Data

Jun. 25, 1986 [GB] United Kingdom ............... 8615478

[51] Int. Cl.$^4$ ............................................. C09K 7/06
[52] U.S. Cl. ................................. 252/8.515; 252/8.511
[58] Field of Search ............... 252/8.515, 8.511, 8.551, 252/8.552

[56] References Cited

U.S. PATENT DOCUMENTS

| | | | |
|---|---|---|---|
| 4,090,562 | 5/1978 | Maly et al. | 252/8.552 X |
| 4,207,193 | 6/1980 | Ford et al. | 252/8.552 X |
| 4,330,414 | 5/1982 | Hoover | 252/8.551 X |
| 4,381,241 | 4/1983 | Romenesko et al. | 252/8.515 |
| 4,392,964 | 7/1983 | House et al. | 252/8.551 X |
| 4,450,095 | 5/1984 | Finlayson | 252/315.2 |
| 4,498,994 | 2/1985 | Heilweil | 252/8.551 X |
| 4,508,628 | 4/1985 | Walker et al. | 252/8.515 |
| 4,514,310 | 4/1985 | Heilweil | 252/8.551 X |
| 4,528,104 | 7/1985 | House et al. | 252/8.551 X |
| 4,566,977 | 1/1986 | Hatfield | 252/8.551 X |
| 4,664,820 | 5/1987 | Magauran et al. | 252/8.515 X |
| 4,670,164 | 6/1987 | Watson et al. | 252/8.551 |

FOREIGN PATENT DOCUMENTS

| | | | |
|---|---|---|---|
| WO8302949 | 9/1983 | PCT Int'l Appl. | 252/8.515 |
| 2000799 | 1/1979 | United Kingdom | 252/363.5 |
| 2115459 | 7/1983 | United Kingdom . | |

*Primary Examiner*—Herbert B. Guynn
*Attorney, Agent, or Firm*—Brooks, Haidt Haffner & Delahunty

[57] ABSTRACT

This invention relates to a base oil composition suitable for use in drilling fluids, the composition comprising an oil component with an aromatic hydrocarbon content of less than 10% w/w and a polar activator which is an ether alcohol or a mixture of ether alcohols. The polar activators used herein mitigates the problems of toxicity, shearing, stability and gelation in drilling fluids containing conventional base oils.

7 Claims, No Drawings

LOW TOXICITY OIL COMPOSITION AND USE THEREOF IN DRILLING FLUIDS

The present invention relates to base oil composition which have relatively lower toxicity than oils having relatively higher aromatic hydrocarbon content for use especially in drilling fluid formulations.

Drilling fluids generally contain as essential ingredients a base fluid component such as diesel or water, emulsifiers, surfactants or wetting agents, clays, water, chlorides of sodium and calcium, and weighting materials. The base component is usually either a water-based, i.e. water forms the continuous phase, or, an oil-based, i.e. oil forms the continuous phase. Normally, water is purposely added to the latter types to give oil based (water-in-oil) emulsions; these are the so-called 'invert emulsions'. The function of the drilling fluid is to (a) cool and lubricate the drill bit and drill string, (b) remove drilled solids, (c) suspend drilled cuttings and other debris by gelation, (d) facilitate control of surface pressures, and (e) prevent caving of formations and to shore up sides of the bore holes.

The type of drilling fluid formulation used will depend amongst others upon the conditions of drilling and the geology of the formation being drilled. In addition the properties of the drilling fluid formulation are also important. These properties include its rheology, density, viscosity, gelation characteristics, ease and rate of filtration, pH value, solids content and stability of the emulsion. In respect of certain down hole conditions invert emulsions are preferred.

Hitherto, the base oil component used in these drilling fluids has almost exclusively been diesel. The reason for this is that diesel is relatively inexpensive and acts quickly upon the organophilic clays present as viscosifiers in drilling fluids and accelerates the swelling and gelation of the clay. This is a necessary mechanism to impart optimum rheology to the fluid. However, in spite of its good performance, diesel is undesirable due to the presence of a high concentration (up to 25% w/w) of aromatic hydrocarbons therein, of which up to 2% are polycyclic, which are toxic. Moreover, a portion of the used drilling fluids based on diesel are usually discharged into the sea because they are retained on the rock cuttings which are difficult to clean and thereby risk pollution of the environment.

Efforts have been made to mitigate this problem by using low toxicity oils. However such oils if used alone require prolonged shearing and/or higher levels of viscosifiers such as clays to achieve the desired initial rheology. It has been recognised that this deficiency of low toxicity oils could be mitigated by using polar activators to make up for the loss of the polar aromatic components in diesel. However, such efforts have been relatively unsuccessful and the drilling industry has become resigned to the added expense of extra shearing or the use of up to 50% more viscosifier clay to replace diesel in drilling fluids.

It has now been found that by choosing a base oil of low toxicity and combining it with an appropriate polar activator, the problems of toxicity, shearing, stability, gelation etc in drilling fluids containing conventional base oils can be mitigated.

Accordingly, the present invention is a base oil composition suitable for use in drilling fluids, said composition comprising an oil component with an aromatic hydrocarbon content of less than 10% w/w and a polar activator which is an ether alcohol or a mixture of ether alcohols.

The oil component in the base oil composition may be suitably kerosine, gas oils low in aromatic hydrocarbons (also known as technical gas oil) or an oil which is derived by diluting diesel with another oil which is low in aromatic hydrocarbon content such that the total aromatic hydrocarbon content of the composition is less than 10% w/w. Such oils are hereafter termed as 'low toxicity oils2 .

The polar activator used in the base oil composition of the present invention is suitably a polar ether alcohol i.e. an ether alcohol which has inherent polarity.

The ether alcohols (also known as "glycol ethers") used contain one or more ether linkages. The ether alcohols may be aliphatic, aromatic or mixtures of these. They are suitably derivable from organic compound having an —OH group (e.g. alcohols or phenols) such as isobutanol or phenol and an alkylene oxide but are preferably derivable from an aromatic compound having —OH groups such as e.g. phenol or a phenoxy propanol and an alkylene oxide which suitably has 2-4 carbon atoms, preferably 2-3 carbon atoms e.g. ethylene oxide or propylene oxide.

Thus the ether alcohol activator can be one or more of a butoxypropanol, isobutoxypropanol, phenoxyethanol, phenoxypropanol, a phenoxypropoxypropanol or substituted derivatives thereof such that the substituents do not adversely affect the performance of the base oil composition when used in drilling fluids.

The relative amounts of the oil component and the polar activator in the base oil composition is suitably such that it contains from 1-5% by weight, preferably from 1.5-3.5% w/w of the activator.

Under certain conditions aromatic ether alcohols such as phenoxypropanol have a tendency to separate out from the base oil. This is particularly so at low temperature. In such a case it is preferable to use the aromatic ether alcohol in conjunction with an aliphatic ether alcohol such as ethoxypropoxypropanol. For instance, at base oil temperature below 15° C., using a mixture of ether alcohols containing from 20-50% w/w of an aliphatic ether alcohol prevents such separation. In addition, the presence of an aliphatic ether alcohol in the mixture depresses the freezing point.

As mentioned previously, drilling fluids contain in addition to the base oil composition conventional components such as clays, water, salts, e.g. chlorides of calcium and sodium, surfactants or emulsifiers and weighting material.

The clays used in drilling fluids containing the base oil compositions of the present invention are suitably organophilic clays. If a hydrophilic clay such as bentonite is available it is necessary to transform these into an organophilic condition e.g. by reaction with appropriate organic ammonium salts by methods well known in the art. These clays act as viscosifiers and the drilling fluid is usually prepared by mixing the conventional components with the base oil composition followed by shearing to achieve the desired rheology, i.e. a fairly low plastic viscosity (PV) and a high yield point (YP) to plastic viscosity ratio, that is YP/PV.

During preparation of a drilling fluid, a preformed base oil composition containing both the low toxicity oil component and the polar activator may be mixed with the other conventional components of such fluids such as clay, water, salts, emulsifiers etc. On the other hand the two components of the base oil composition of the present invention may be mixed separately with the other drilling fluid components during agitation or shearing. In the latter case it is preferable to first mix all the polar activator and from one-quarter to one-half of the total low toxicity oil component with the clay and other ingredients. This result in a rapid swelling and gelation of the clay within a few seconds. Thereafter the remainding three quarters of the low toxicity oil component can be added to the swollen gel followed by shearing to achieve a drilling fluid of desired rheology, i.e. a very high YP/PV ratio.

The use of a combination of a low toxicity oil, i.e. an oil component low (less than 10% w/w) in aromatic hydrocarbon content, and a polar activator as the base oil composition can be further enhanced by reducing the amount of emulsifiers used in the drilling fluids. The resultant drilling fluids show a yield point only marginally less than those using diesel as the base oil and yet retain the advantage of low toxicity and low plastic viscosity.

The base oil compositions of the present invention and the use thereof in drilling fluids is further illustrated with reference to the following Examples.

EXAMPLES

In order to demonstrate the relative effectiveness of alcohol ethers as polar activators, other proprietary compounds such as propylene carbonate were also tested for comparison. The results of these tests are tabulated below:

TABLE 1

Materials Used

| Base Oil | Composition paraffin: P naphthene: N aromatic A | Boiling Range °C. | Flash Point (PMCC) °C. | Kinematic Viscosity at 40° C. cS |
|---|---|---|---|---|
| Low Toxicity Kerosine* | P:N:A 56:42:2 | 195–255 | 72 | 1.7 |
| Low Toxicity Technical Gas Oil* | P:N:A 74:23:3 49:42:9 | 210–312 218–310 | 109 100 | 2.5 2.9 |
| Diesel** | P:N:A 42:37:21 | 200–365 | 65–75 | 3.3 |

*Some variation in composition and physical properties occur due to variations in crude oil feedstock.
**Sample used was not analysed. Properties shown above are for a typical diesel oil.

TABLE 2

Polar Activators Used

| Polar Activators | Approximate Composition |
|---|---|
| Phenoxypropanol (PhP) | |
| Phenoxypropoxypropanol (PhDP) | |
| Mixed Phenoxypropanol/ Phenoxypropoxy propanol | Essentially a mixture of PhP/PhDP (95/5 w/w) |
| Mixed Isobutoxypropanol (IBP)/isobutoxypropoxy propanol (IBDP) | Essentially IBP 75%, IBDP 21% and others 4%). |
| Phenoxypropanol (PhP) + Ethoxypropoxypropanol (EDP) | PhP is the activator and EDP is the cosolvent |
| Acetophenone | |
| Propylene carbonate | |

TABLE 3

| Materials Sources (and their role in drilling fluids) | |
|---|---|
| Other Standard Drilling Fluid Components | Remarks |
| Geltone II* | A gel-forming organophilic clay with bentonitic structure. |
| Duratone H7* | An oil dispersible lignitic colloid used to control the filtration of oil muds. It also aids in solids suspension and emulsification. |
| Calcium Chloride | This is dissolved in the water phase to provide osmotic force to dehydrate water wet formations and increases the mud density. |
| Lime | Essential to adjust pH and ensure optimum performance of the emulsifiers. |
| Invermul-L* | Maleic-tall oil amide in kerosine solvent. This is a water-in-oil primary emulsifier. |
| Ezmul* | Partial amide of polyamine and fatty acid in kerosine solvent. It is a secondary emulsifier and oil-wetting agent which ensures that baryte and drilled solids do not become water-wetted. |
| Baryte | Barium sulphate (specific gravity 4.5) is used as weighting agent. |

*Registered Trade Mark

1. Rheology Measurement

The characteristics of a drilling fluid can be closely defined by quoting values for PV, YP and gel strength. Standard field and laboratory tests have been devised which are quick and practical. Such test only approximately reflect downhole behaviour, but they serve their purpose if their limitations are understood and if the data obtained from them are correlated with experience.

A Fann viscometer was used in this study to determine the rheology of low toxicity kerosine, low toxicity technical gas oil and diesel based drilling fluids. See Section 3 below for more details.

2. Standard Drilling Fluid Preparation (General Procedure)

The drilling fluid base oil and polar activator, if any, were measured into the mixing vessel and agitation started using an Ystral mixer. A reduced shear rate (Variac controller setting : 100v) was used for all stages until the final addition of barytes. Geltone and Duratone powders were added over a period of 30 seconds. The mixture was sheared for 10 minutes.

The calcium brine was added and shearing was continued for a further 20 minutes.

The lime, Invermul and Ezmul were added and the shearing was continued for an additional 5 minutes.

The shear rate was increased (Variac setting : 120 v) and the baryte was added incrementally over one or two minutes. Finally the complete drilling fluid was sheared at the higher rate for 30 minutes. The vigorous mixing caused the drilling fluid to heat up; the final temperature being 60°±5° C.

When circulating in the oil well, the drilling fluid is exposed to much more severe shearing through the drilling bit at downhole temperatures of 150° C. or more. Under these conditions, the organophilic clay will yield to provide maximum structural properties after a few circulations. For specific amounts of various components used see Tables 4 and 6 below.

TABLE 4

Drilling Fluids - Their Composition and Preparation
Standard[a] Drilling Fluid Composition

| | Quantities used |
|---|---|
| Lox toxicity oil or diesel | 270 ml |
| Polar activator (if any) | 5.5 ml |
| | (5.8 g for PhP; d = 1.06) |
| Geltone II | 8.0 g |
| Duratone H7 | 8.7 g |
| Calcium brine solution | 85 ml |
| (brine concentration: 463 g | |
| CaCl$_2$.6H$_2$O diluted to 500 ml H$_2$O) | |
| Lime | 8.0 g |
| Invermul solution | 20 ml |
| (Invermul solution conc: 50% | |
| vol in base oil)[b] | |
| Ezmul solution | 8.0 ml |
| (Ezmul solution conc: 50% | |
| vol in kerosine) | |
| Baryte | 330 g |

Notes:
[a]The drilling fluid composition was varied slightly in some formulations; details of divergences from the above composition are given in Table 6. This formulation is for a 12.2 pounds (weight) per gallon drilling fluid.
[b]Since primary and secondary surfactants (Invermul and Ezmul) were viscous liquids, stock solutions were prepared by diluting to 50% concentration by volume in base oil. The 50% solution was then used in all drilling fluid preparations.

3. Rheology Measurements with the Fann 35SA Direct Indicating Viscometer

This is a concentric cylinder viscometer that enables the variation of shearing stress with shear rate to be observed.

Procedure for Measuring Drilling Fluid Rheology

The freshly prepared drilling fluid was transferred to screw top storage jars. Experience showed that the rheological characteristics of the drilling fluid did not change significantly over a period of 3 months' storage, unless exposed to further heating or shearing.

Just prior to the viscosity measurements, the drilling fluid temperature was dropped 2 or 3 degrees below 20° C. The jar was vigorously shaken to ensure fluid homogeneity. A pre-set volume of drilling fluid was then transferred to the stainless steel breaker of the Fann viscometer. Then the beaker was raised until the drilling fluid surface reached a prescribed mark on the outer cylinder of the viscometer.

Readings were taken at each of six rotation speeds at the moment when the temperature had risen to 20° C., it was found that small divergences from this temperature could significantly affect the viscosity readings.

The drilling fluid was then stirred by switching to maximum rotational speed for 30 seconds. Rotation was stopped for 10 seconds, then re-started at 3 rpm and the maximum momentary reading noted. Rotation was stoped again, but this time for a period of 10 minutes. After this period at rest, the maximum deflection at 3 rpm was noted once more.

Calculation of Results

The following example is for a kerosine drilling fluid with no polar activator (cf Table 6):

TABLE 5

| Viscometer Rotational Speed (rpm) | Viscometer Readings at 20° C. |
|---|---|
| 600 | 60 |
| 300 | 33 |
| 200 | 24 |
| 100 | 14 |
| 6 | 4 |
| 3 | 3 |
| Reading after 10 seconds rest | 4 |
| Reading after 10 minutes rest | 7 |

Apparent Viscosity (AV) = $\frac{600 \text{ rpm reading}}{2} = \frac{60}{2} = 30$ cP Plastic Viscosity (PV) = cP
600 rpm reading − 300 rpm reading = 60 − 33 = 27

Yield Point (YP) = 300 rpm reading − PV = 33 − 27 = 6 lb/100 ft$^2$

Gel strength = $\frac{\text{Max. deflection after 10s at rest}}{\text{Max. deflection after 10 mins at rest}} = \frac{4}{7}$ Ratio of Yield Point to Plastic Viscosity = $\frac{6}{27} = 0.22$ In the data tabulated in Table 6 the following abbreviations have been used:
LTK—Low toxicity kerosine
LTGO—Low toxicity technical gas oil
AV—Apparent viscosity (cP)
PV—Plastic viscosity (cP)
YP—Yield point (lb/100 ft$^2$).

TABLE 6

Drilling Mud Rheologies (20° C.)

| | Mud Run Number | | | | | | | |
|---|---|---|---|---|---|---|---|---|
| | 1 | 2 | 3 | 4 | 5 | 6 | 7 | 8 |
| Base Oil | LTK | LTGO | Diesel | LTK | LTK | LTK | LTK | LTK |
| Activator (% weight on base oil) | — | — | — | PhP (2.7%) | PhP (2.7%) | PhDP (2.7%) | PhDP (2.8%) | PhP/PhDP Mixture (2.7%) |
| Special Features of Mud | | | | | (a) | | (b) | |
| Shear Rate (rpm) | | | | | | | | |
| 600 | 60 | 85 | 144 | 74 | 70 | 75 | 68 | 74 |
| 300 | 33 | 47 | 86 | 44 | 44 | 44 | 40 | 43 |
| 200 | 24 | 34 | 66 | 34 | 35 | 34 | 31 | 34 |
| 100 | 14 | 20 | 42 | 23 | 23 | 23 | 21 | 23 |
| 6 | 4 | 6 | 16 | 8 | 9 | 9 | 7 | 8 |
| 3 | 3 | 5 | 14 | 7 | 8 | 8 | 6 | 7 |
| Gel Strength | 4/7 | 7/12 | 18/25 | 9/11 | 9/10 | 9/12 | 7/9 | 9/11 |
| Apparent vis (AV) (cP) | 30 | 43 | 72 | 37 | 35 | 38 | 34 | 37 |
| Plastic vis (PV) (cP) | 27 | 38 | 58 | 30 | 26 | 31 | 28 | 31 |
| Yield Point (YP) (lb/100 ft$^2$) | 6 | 9 | 28 | 14 | 18 | 13 | 12 | 12 |

TABLE 6—continued

Drilling Mud Rheologies (20° C.)

| Ratio $\frac{YP}{PV}$ | 0.22 | 0.24 | 0.48 | 0.47 | 0.69 | 0.42 | 0.43 | 0.39 |
|---|---|---|---|---|---|---|---|---|

| | Mud Run Number | | | | | | | |
|---|---|---|---|---|---|---|---|---|
| | 9 | 10 | 11 | 12 | 13 | 14 | 15 | 16 |
| Base Oil | LTK | LTK | LTK | LTK | LTK | Diesel | LTGO | LTK |
| Activator (% weight on base oil) | PhP (5.5%) | — | PhP/PhDP Mixture (2.7%) | PhP/PhDP Mixture (2.7%) | — | — | PhDP/PhDP Mixture (2.7%) | IBP/IBDP Mixture (2.7%) |
| Special Features of Mud | | (c) | (d) | (e) | (f) | (g) | (h) | |
| Shear Rate (rpm) | | | | | | | | |
| 600 | 77 | 67 | 75 | 89 | 80 | 126 | 94 | 63 |
| 300 | 44 | 36 | 46 | 57 | 44 | 75 | 58 | 35 |
| 200 | 34 | 26 | 35 | 43 | 32 | 58 | 46 | 26 |
| 100 | 24 | 16 | 24 | 30 | 19 | 38 | 31 | 17 |
| 6 | 9 | 4 | 8 | 11 | 5 | 15 | 11 | 6 |
| 3 | 8 | 3 | 6 | 10 | 4 | 14 | 9 | 5 |
| Gel Strength | 8/10 | 7/8 | 8/10 | 12/14 | 6/11 | 16/20 | 10/12 | 7/9 |
| Apparent vis (AV) (cP) | 39 | 34 | 38 | 45 | 40 | 63 | 47 | 32 |
| Plastic vis (PV) (cP) | 33 | 31 | 29 | 32 | 36 | 51 | 36 | 28 |
| Yield Point (YP) (lb/100 ft$^2$) | 11 | 5 | 17 | 25 | 8 | 24 | 22 | 7 |
| Ratio $\frac{YP}{PV}$ | 0.33 | 0.16 | 0.59 | 0.78 | 0.22 | 0.47 | 0.61 | 0.25 |

| | Mud Run Number | | | | | | | |
|---|---|---|---|---|---|---|---|---|
| | 17 | 18 | 19 | 20 | 21 | 22 | 23 | 24 |
| Base Oil | LTGO | LTGO | LTGO | LTGO | LTGO | LTGO | LTK | LTK |
| Activator (% weight on base oil) | 1.0 PhP | 1.5 PhP | 2.0 PhP | 2.25 PhP | 5.4 PhP | 2.0 PhP 1.0 EDP | Propylene Carbonate (2.7%) | Acetophenone (2.7%) |
| Special Features of Mud | | | | | | | | |
| Shear Rate (rpm) | | | | | | | Viscometer Readings | Fann |
| 600 | 101 | 99 | 99 | 105 | 95 | 92 | 65 | 68 |
| 300 | 59 | 58 | 59 | 62 | 56 | 54 | 35 | 38 |
| 200 | 45 | 44 | 45 | 47 | 42 | 41 | 25 | 28 |
| 100 | 29 | 28 | 30 | 31 | 27 | 26 | 16 | 18 |
| 6 | 9 | 8 | 10 | 9 | 8 | 8 | 3 | 6 |
| 3 | 8 | 7 | 8 | 8 | 7 | 7 | 2 | 5 |
| Gel Strength | 8/12 | 8/10 | 9/11 | 8/11 | 8/10 | 8/10 | 4/5 | 6/8 |
| | | | | | | | Derived Rheology Props. | |
| Apparent vis (AV) (cP) | 51 | 50 | 50 | 53 | 48 | 46 | 33 | 34 |
| Plastic vis (PV) (cP) | 42 | 41 | 40 | 43 | 39 | 38 | 30 | 30 |
| Yield Point (YP) (lb/100 ft$^2$) | 17 | 17 | 19 | 19 | 17 | 16 | 5 | 8 |
| Ratio $\frac{YP}{PV}$ | 0.41 | 0.41 | 0.48 | 0.44 | 0.44 | 0.42 | 0.17 | 0.27 |

(a) Base oil added in two portions such that Geltone initially in contact with more concentrated PhP solution (10%)
(b) Same as Run 6 except that slightly more PhDP used and order of addition of PhDP and Geltone to base oil reversed (Geltone added first)
(c) Repeat of standard preparation (see Run 1) except Invermul solution halved to 10 ml (see Section 2)
(d) Repeat of Run 8, except Invermul solution halved to 10 ml
(e) Repeat of Run 11 except base oil added in two portions so that Geltone initially in contact with more concentrated polar activator solution (4.4%)
(f) Repeat of standard preparation (see Run 1), except Geltone increased by one third (10.7 g used instead of 8.0 g - see Section 2)
(g) Repeat of diesel preparation (see Run 3) except Geltone decreased by one third (5.3 g used instead of 8.0 g - See Section 2)
(h) Base oil added in two portions so that Geltone initially in contact with more concentrated polar activator (4.4%). Invermul solution halved to 10 ml

We claim:

1. A base oil composition suitable for use in organophilic clay-containing drilling fluids, said composition consisting essentially of: an oil component with an aromatic hydrocarbon content of less than 10% w/w; and from 1-5% of a polar activator which is an aliphatic or aromatic ether alcohol or is a mixture of ether alcohols selected from one or more of butoxypropanol, isobutoxypropanol, phenoxypropanol and phenoxypropoxy propanol.

2. A base oil composition according to claim 1 wherein the polar activator is a mixture of an aromatic ether alcohol and an aliphatic ether alcohol, the latter being present in the mixture in an amount from 20-50% w/w of the total mixture.

3. A drilling fluid consisting essentially of: one or more organophilic clays, and a base oil composition, said base oil composition consisting essentially of: an oil component with an aromatic hydrocarbon content of less than 10% w/w and from 1-5% w/w of a polar activator which is an aliphatic or aromatic ether alcohol or is a mixture of ether alcohols selected from one or more of butoxypropanol, isobutoxypropanol, phenoxypropanol and phenoxypropoxy propanol.

4. A drilling fluid according to claim 3 wherein said fluid is prepared by initially mixing the polar activator and one quarter of the oil component of the base oil composition with the clay, allowing the mixture to swell and gel, thereafter adding the remaining three quarters of the oil component to the swollen gel an finally shearing the total mixture to form the drilling fluid.

5. A drilling fluid as claimed in claim 3 wherein the polar activator is a mixture of an aromatic ether alcohol and an aliphatic ether alcohol, the latter being present in the mixture in an amount from 20-50% w/w of the total mixture.

6. A drilling fluid as claimed in claim 3 wherein the drilling fluid further contains one or more of water, halide salts of sodium or calcium, surfactants, emulsifiers, and weighting materials.

7. A drilling fluid as claimed in claim 6 wherein said fluid is prepared by initially mixing the polar activator and one quarter of the oil component of the base oil composition with the clay, allowing the mixture to swell and gel, thereafter adding the remaining three quarters of the oil component to the swollen gel and finally shearing the total mixture to form the drilling fluid.

* * * * *

UNITED STATES PATENT AND TRADEMARK OFFICE
CERTIFICATE OF CORRECTION

PATENT NO. : 4,839,096

DATED : June 13, 1989

INVENTOR(S) : Robert W. Dennis et al

It is certified that error appears in the above-identified patent and that said Letters Patent is hereby corrected as shown below:

Col. 2, l. 10, "oils2." should be --oils'.--

Col. 2, l. 17, should read "compound<u>s</u>"

Table 6, should read "(% weight on base oil<u>)</u>"

Claim 4, col. 9, l. 13, should read "swollen gel an<u>d</u> finally"

Signed and Sealed this

Twenty-fifth Day of December, 1990

Attest:

HARRY F. MANBECK. JR.

*Attesting Officer*  *Commissioner of Patents and Trademarks*